(12) United States Patent
Karapantelakis et al.

(10) Patent No.: US 11,012,539 B2
(45) Date of Patent: May 18, 2021

(54) ACCESSING DATA AT A NETWORK NODE

(71) Applicant: Telefonaktiebolaget LM Ericsson (publ), Stockholm (SE)

(72) Inventors: Athanasios Karapantelakis, Stockholm (SE); Elena Fersman, Stockholm (SE); Leonid Mokrushin, Uppsala (SE); Ricardo Souza, Indaiatuba (BR); Maxim Teslenko, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 16/474,099

(22) PCT Filed: Jan. 5, 2017

(86) PCT No.: PCT/EP2017/050210
§ 371 (c)(1),
(2) Date: Jun. 27, 2019

(87) PCT Pub. No.: WO2018/127287
PCT Pub. Date: Jul. 12, 2018

(65) Prior Publication Data
US 2019/0387078 A1    Dec. 19, 2019

(51) Int. Cl.
| | | |
|---|---|---|
| *G06F 15/16* | (2006.01) | |
| *H04L 29/06* | (2006.01) | |
| *H04W 4/70* | (2018.01) | |
| *H04L 12/28* | (2006.01) | |
| *H04L 29/08* | (2006.01) | |

(52) U.S. Cl.
CPC .......... *H04L 69/08* (2013.01); *H04L 12/2827* (2013.01); *H04L 67/12* (2013.01); *H04W 4/70* (2018.02)

(58) Field of Classification Search
CPC ..... H04L 69/08; H04L 12/2827; H04L 67/12; H04W 4/70
USPC .................................................. 709/203, 246
See application file for complete search history.

(56) References Cited

U.S. PATENT DOCUMENTS

| | | | |
|---|---|---|---|
| 6,208,986 B1 | 3/2001 | Schneck et al. | |
| 6,789,057 B1 * | 9/2004 | Morimoto | G06F 40/211 |
| | | | 704/2 |
| 2004/0263530 A1 * | 12/2004 | Sahuc | H04N 21/45452 |
| | | | 345/619 |

(Continued)

OTHER PUBLICATIONS

International Search Report and Written Opinion of the International Searching Authority, PCT/EP2017/050210, dated Jul. 20, 2017, 15 pages.

*Primary Examiner* — Duyen M Doan
(74) *Attorney, Agent, or Firm* — Sage Patent Group

(57) ABSTRACT

The present disclosure relates to network nodes and methods performed at the network nodes for accessing data acquired in a communication system. In an aspect of the present disclosure, a method performed at a network node is provided to access data acquired in a communication system. The method includes acquiring data from which at least one information set is to be derived, determining that said at least one information set cannot be derived from the acquired data, and submitting a request for assistance to derive said at least one information set from the acquired data. The method further includes receiving, in response to the submitted request, information enabling deriving of said at least one information set.

19 Claims, 7 Drawing Sheets

(56) References Cited

U.S. PATENT DOCUMENTS

2009/0240193 A1* 9/2009 Mensinger ............ H04L 67/125
   604/66
2014/0359035 A1   12/2014 Wang et al.
2017/0374490 A1* 12/2017 Schoppmeier .......... H04W 4/70
2018/0129805 A1*  5/2018 Samuel ................... G06F 21/86

* cited by examiner

ACCESSING DATA AT A NETWORK NODE

This application is a 35 U.S.C. § 371 national stage application of PCT International Application No. PCT/EP2017/050210 filed on Jan. 5, 2017, the disclosure and content of which is incorporated by reference herein in its entirety.

TECHNICAL FIELD

The present disclosure relates to network nodes and methods performed at the network nodes for accessing data acquired in a communication system.

BACKGROUND

In the art, technologies exist enabling a network node to request a service from another network node. A general example is a node which has access to data and wishes to communicate with another network node in order to process this data.

Typical examples of technologies used for such service requests combine the well-known Transmission Control Protocol/Internet Protocol (TCP/IP) stack which is widely used over the Internet, together with application-layer protocols such as Hypertext Transfer Protocol (HTTP)-based Representational State Transfer (REST).

A problem in the art is that a network node which acquires data for processing from another node (e.g. for rendering or analysis) may not be able to properly access the data to be processed, for example due to a format that the processing network node cannot adequately interpret.

SUMMARY

An object of the present disclosure is to solve, or at least mitigate, this problem in the art and thus to provide an improved method of accessing acquired data.

This object is attained in a first aspect of the present disclosure by a method performed at a network node of accessing data acquired in a communication system. The method comprises acquiring data from which at least one information set is to be derived, determining that said at least one information set cannot be derived from the acquired data, and submitting a request for assistance to derive said at least one information set from the acquired data. The method further comprises receiving, in response to the submitted request, information enabling deriving of said at least one information set.

This object is attained in a second aspect of the present disclosure by a network node configured to access data acquired in a communication system. The network node comprises a processing unit and a memory, said memory containing instructions executable by said processing unit, whereby said network node is operative to acquire data from which at least one information set is to be derived, determine that said at least one information set cannot be derived from the acquired data, submit a request for assistance to derive said at least one information from the acquired data, and receive, in response to the submitted request, information enabling deriving of said at least one information set.

This object is attained in a third aspect of the present disclosure by a method performed at a network node of assisting another network node to access data acquired in a communication system. The method comprises receiving a request for assistance to derive at least one data set from data acquired by said another network node, acquiring information required for enabling said another network node to derive said at least one information set; and submitting, in response to the submitted request, the acquired information enabling said another network node (101, 105) to derive said at least one information set.

This object is attained in a fourth aspect of the present disclosure by a network node configured to assist another network node to access data acquired in a communication system. The network node comprises a processing unit and a memory, said memory containing instructions executable by said processing unit, whereby said network node is operative to receive a request for assistance to derive at least one data set from data acquired by said another network node, acquire information required for enabling said another network node to derive said at least one information set, and submit, in response to the submitted request, the acquired information enabling said another network node to derive said at least one information set.

In an embodiment, a client node such as e.g. a wireless communications device embodied in the form of a smart phone runs an App for collecting Internet-of-Things (IOT) related data from sensors installed in a home of a user of the smart phone. For instance, the user of the smart phone may want to know indoor temperature as measured by a thermometer implemented in a wall paper of her home.

Hence, the user's smart phone engages in machine-to-machine (M2M) communication with "smart" equipment in the user's home in order to communicate the desired M2M data to the user via the App installed on the smart phone.

Now, the M2M equipment of the user's home may be of different brands and thus e.g. use different data formatting when supplying the requested M2M data to the smart phone for presentation to the user. As a consequence, the App may not be able to correctly interpret the received M2M data for adequate presentation to the user.

For example, the data may be encoded using a binary format such as Binary Universal Form for the Representation of Meteorological Data (BUFR) or Traditional Alfanumeric Codes (TAC), as provided by the World Meteorological Organization (WMO), which the smart phone is not capable of interpreting in order to derive a temperature value as measured by the thermometer.

As a consequence thereof, the smart phone submits a request for assistance to derive the temperature value from the acquired data to a service provision (SP) node, being e.g. an Internet server, having access to information required for the smart phone to be capable of correctly interpreting the data from the thermometer. In the case of the smart thermometer example, this would be a server that can provide information on how to decode the temperature data from TAC or BUFR format to any appropriate format which can be correctly interpreted, such as for example raw text.

The SP node thus acquires the information required for enabling the smart phone to derive the temperature value, for instance by fetching the information from a locally stored database.

In response to the request from the smart phone, the SP node replies by supplying the smart phone with the information required for the smart phone to be able to interpret the thermometer data for adequate presentation to the user.

Advantageously, with the assistance of the SP node, the acquired thermometer data can advantageously be derived and adequately presented to the user of the smart phone.

In an embodiment, the client node will thus process the received information to derive the at least one information set, in the above exemplified by means of the thermometer data.

In another embodiment, the client node submits the acquired data with the request for assistance, and receives a transformed version of the acquired data, the transformed version being a version of the acquired data from which the at least one information set can be derived.

In yet another embodiment, the client node submits with the request for assistance an indication of a provider of the acquired data, and receives template data enabling deriving of the at least one information set from the acquired data.

In still another embodiment, the request for assistance comprises an indication of a computer program application which is to derive the at least one information set.

In yet an embodiment, the client node submits the acquired data to a further network node which is to access the acquired data, and receives an indication that the further network node cannot derive the at least one information set from the acquired data, wherein the client node forwards the information enabling deriving of the at least one information set to the further network node.

In another embodiment the SP node acquires, upon receiving the request for assistance, information required for enabling deriving of the at least one information set by submitting a request for the information to at least one data providing (DP) network node being associated with the acquired data, and receives the requested information in response thereto.

In still another embodiment the SP node acquires, upon receiving the request for assistance, information required for enabling deriving of the at least one information set by submitting a request for the information to a first DP network node being associated with the acquired data for enabling deriving of a first information set, and submitting a request for the information to a second DP network node being associated with the acquired data for enabling deriving of a second information set. The SP node further receives the requested information from the first DP network node, and receives the requested information from the second DP network node and aggregates the information received from the first DP network node and the second DP network node. The SP node subsequently submits the aggregated information to the client node.

In a further aspect, a system comprising at least one client node and at least one SP node is provided.

Further provided is a computer program comprising computer-executable instructions for causing the client node to perform steps of the method according to the first aspect of the present disclosure, when the computer-executable instructions are executed on a processing unit included in the client node.

Yet further provided is a computer program product comprising a computer readable medium, the computer readable medium having the computer program of the client node embodied thereon.

Further provided is a computer program comprising computer-executable instructions for causing the SP node to perform steps of the method according to the third aspect of the present disclosure, when the computer-executable instructions are executed on a processing unit included in the SP node.

Yet further provided is a computer program product comprising a computer readable medium, the computer readable medium having the computer program of the SP node embodied thereon.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The example embodiments of invention are now described, with reference to the accompanying drawings, in which.

DETAILED DESCRIPTION

Embodiments of the invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
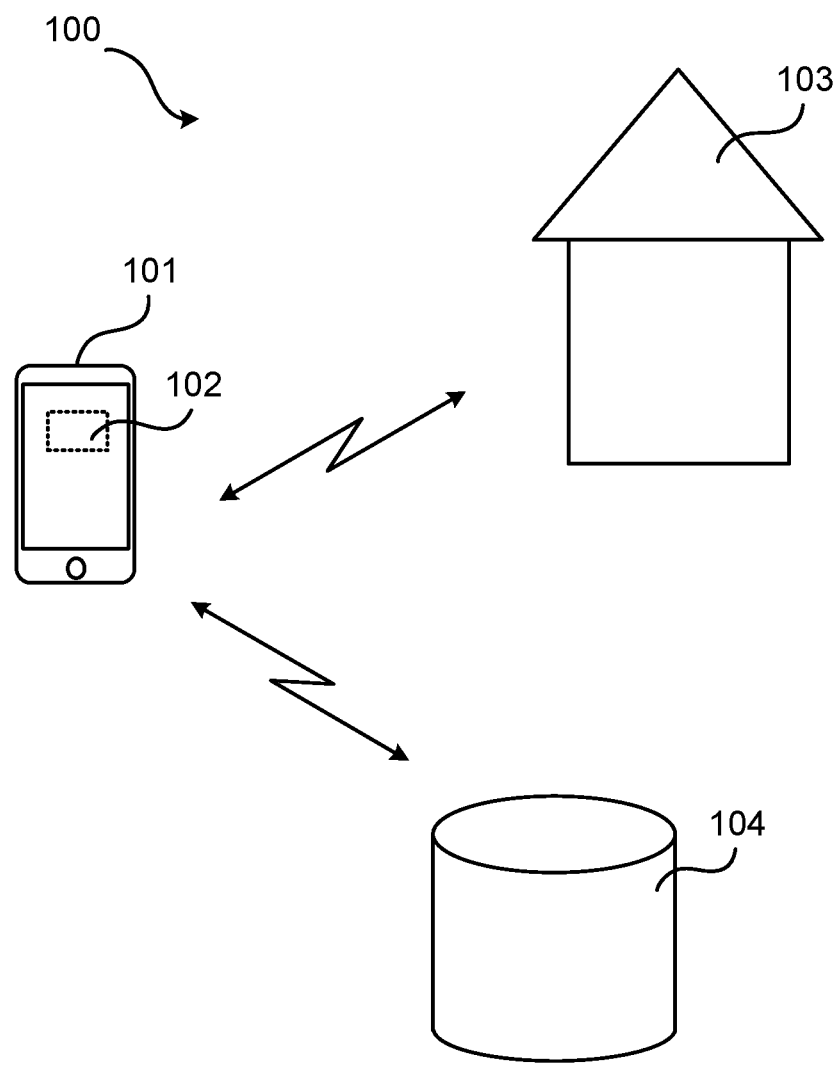
FIG. 1 illustrates a communication system in which a client node and a service providing node according to embodiments of the invention are implemented.

FIG. 1 illustrates a communication system 100 in which client node 101 and a service providing node 104 according to embodiments of the invention are implemented. The client node 101 may be a wireless communications device, commonly referred to as a User Equipment (UE), embodied in the form of a smart phone, tablet, laptop, a gaming console, etc., or a so called fixed wireless terminal (FWT) in the form of e.g. a television set, a computer, or a set top box, etc.

In this particular exemplifying embodiment, it is assumed that the client node 101 is embodied in the form of a smart phone, which runs an App 102 for collecting Internet-of-Things (IOT) related data from sensors installed in a home 103 of a user of the smart phone 101.

For instance, the user of the smart phone 101 may want to know indoor temperature as measured by a thermometer implemented in a wall paper of her home, whether a washing program executed by her washing machine has finished or not, if there are any groceries missing as detected by her WiFi-connected refrigerator, or whether the indoor lighting is on or off, etc.

Hence, the user's smart phone 101 engages in machine-to-machine (M2M) communication with "smart" equipment in the user's home 103 (or with a central device supervising the equipment) in order to communicate the desired M2M data to the user via the App 102 installed on the smart phone 101.

Now, the M2M equipment of the user's home 103 may be of different brands and thus e.g. use different formatting when supplying the requested M2M data to the smart phone 101 for presentation to the user via a graphical user interface of the App 102. As a consequence, the App 102 may not be able to correctly interpret the received M2M data for adequate presentation to the user.

Figure 2:
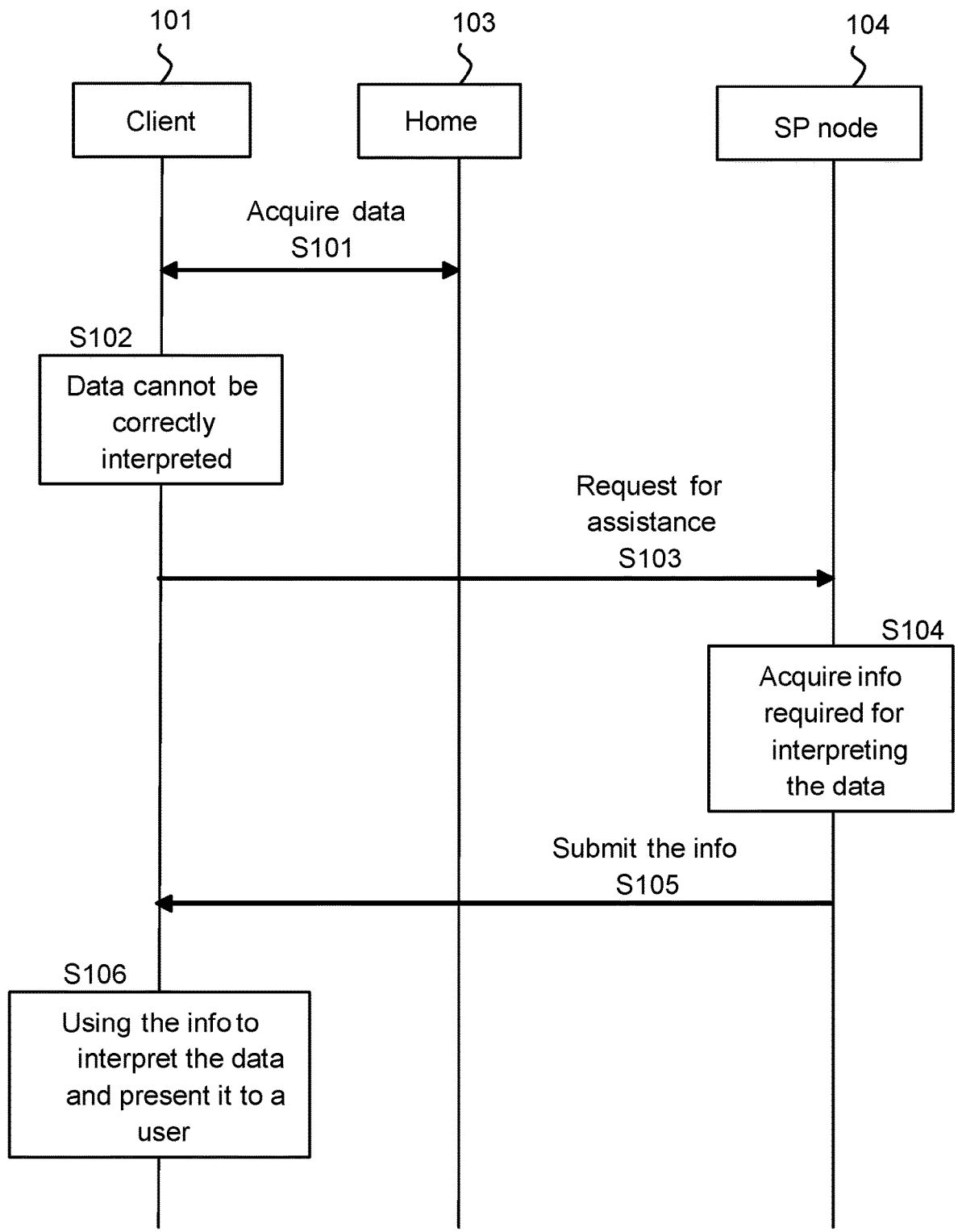
FIG. 2 shows a signalling diagram illustrating a method of accessing acquired data according to an embodiment.

A method of accessing acquired data according to an embodiment for solving this problem will now be described with reference to the communication system 100 of FIG. 1 and further to a signalling diagram shown in FIG. 2.

As described hereinabove, the smart phone 101 acquires data in step S101 from network-connected equipment of her home 103. This may be performed using a pull approach where the smart phone 101 actively fetches desired data, or a push approach where the equipment of the home 103 occasionally delivers desired data to the smart phone, or a combination thereof.

Upon acquiring the data in step S101, the smart phone 101 determines in step S102 whether one or more information sets can be derived from the acquired data as intended. In this particular embodiment, the smart phone 101 (or the App 102 executing on the smart phone 101) determines whether the acquired data can be correctly interpreted in order to be adequately presented to the user of the phone 101. To be able to interpret the acquired data, the smart phone must be capable of deriving one or more information sets from the data.

In this example, it is determined that data acquired from a thermometer of the home 103 cannot be correctly interpreted for presenting the indoor temperature to the user. For example, the data may be encoded using a binary format such as Binary Universal Form for the Representation of Meteorological Data (BUFR) or Traditional Alfanumeric Codes (TAC), as provided by the World Meteorological Organization (WMO). Hence, it is not possible for the smart phone 101 to derive a temperature value as measured by the thermometer from the acquired data.

As a consequence thereof, the smart phone 101 submits in step S103 a request for assistance to derive the temperature value from the acquired data to a service provision (SP) node 104, being e.g. an Internet server, having access to information required for the smart phone 101 to be capable of correctly interpreting the data from the thermometer that was acquired in step S101. In the case of the smart thermometer example, this would be a server that can provide information on how to decode the temperature data from TAC or BUFR format to any appropriate format which can be correctly interpreted, such as for example raw text.

The SP node 104 thus acquires, in step S104, the information required for enabling the smart phone 101 to derive the temperature value, for instance by fetching the information from a locally stored database.

In response to the request from the smart phone 101 in step S103, the SP node 104 replies by supplying the smart phone 101 in step S105 with the information required for the smart phone 101 to be able to interpret the thermometer data acquired in step S101 for adequate presentation to the user.

Advantageously, with the assistance of the SP node 104, the acquired thermometer data can advantageously be derived and adequately presented to the user of the smart phone 101 subsequently in step S106.

It is noted that the request for assistance submitted from the smart phone 101 to the SP node 104 may be a request to derive a plurality of information sets from the data acquired in step S101, and correspondingly that the reply from the SP node 104 in step s105 comprises information required for deriving the respective information set.

In an embodiment, the request for assistance submitted to the SP node 104 in step S103 comprises the acquired data that cannot be interpreted by the smart phone 101 in order to derive the measured temperature value, and therefore cannot be adequately presented to the user for data formatting reasons.

Upon receiving the data to be interpreted in step S103, the SP node 104 transforms the data in step S104 as required for the smart phone 101 to be able to derive the measured temperature value and subsequently present it to the user, and sends the transformed version of the acquired data to the smart phone 101 for subsequent user presentation. In this example, the SP node 104 transforms the acquired data by rearranging the data in accordance with a format that the smart phone 101 in fact can interpret, and submits the rearranged data to the smart phone in step S105.

In a further embodiment, the request for assistance submitted to the SP node 104 in step S103 comprises an indication of a provider of the acquired data, e.g. the manufacturer of the thermometer or the M2M system provider. The SP node 104 may thus turn to its locally stored database in step S104 for fetching a template to be used for interpreting the acquired data for this particular sensor manufacturer or M2M system provider.

The SP node 104 replies in step S105 with sending complementing information to the smart phone 101, which can be used at the phone 101 for interpreting the acquired data, for instance in the form of the template or key used by the phone 101 the encode the acquired data to a format being interpretable by the phone 101, such that the measured temperature value can be derived from the transformed data for adequate presentation to the user in step S106. Hence, is may be envisaged that all data from a particular sensor or M2M system provider should be rearranged in the same manner in order to make it presentable to the user, in which case it is not necessary to submit the actual data to be interpreted in step S103.

It may be envisaged that the SP node 104 requires an indication of the manufacturer of the thermometer from which the acquired data originates to acquire the correct information in step S104 and provide it to the smart phone 101 in step S105, even in a case where the data to be interpreted was submitted with the request in step S103. It may further be envisaged that the SP node 104 requires an indication of which particular App 102 the smart phone 101 is executing such that any data formatting can be adapted to this particular App 103.

Again with reference to FIG. 1; in the communication system 100, the SP node 104 according to an embodiment is illustrated as being a separate device remotely located from the smart phone 101.

In an alternative embodiment, the functionality of the SP node 104 is implemented in the smart phone 101. For instance, it is envisaged that a data base comprising required information for interpreting data acquired from a variety of providers is stored locally in the smart phone 101 and accessed by the App 102 when required. The data base may occasionally be updated, for instance via Apple's "App Store" or "Google Play" in case of an Android smart phone.

In such an embodiment, the smart phone 101 is advantageously not required to communicate with a further node, but may turn to its local storage where the database is held.

In yet an embodiment, the acquired data is not be presented on the smart phone 101 of the user, but is forwarded to a server 105, for instance for data collection and analysis. This server will in the following be referred to as data collection (DC) server 105.

Figure 3:
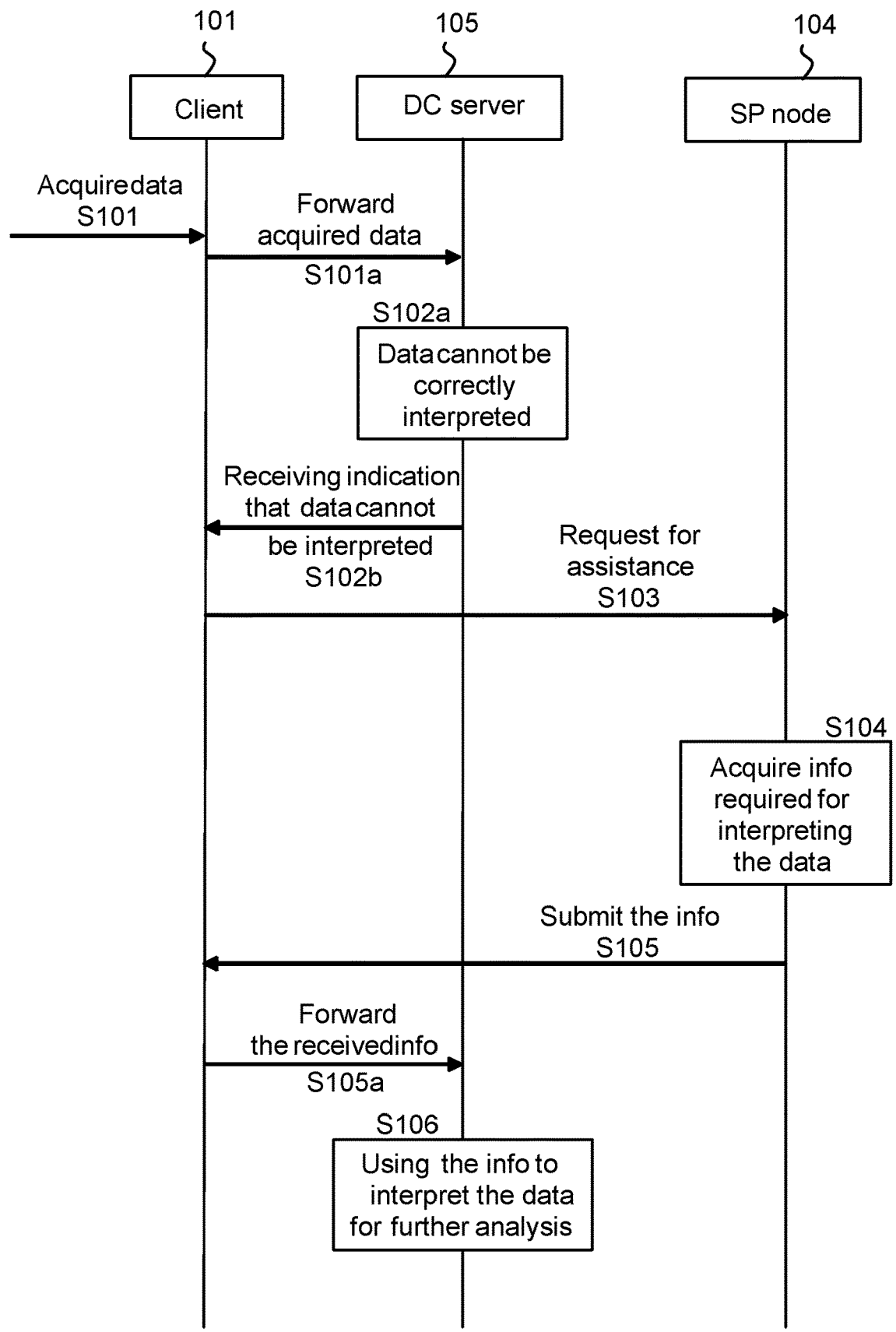
FIG. 3 shows a signalling diagram illustrating a method of accessing acquired data according to another embodiment.

This embodiment will now be described with reference to the signalling diagram shown in FIG. 3.

After having acquired the "connected home" M2M data in step sun, the smart phone 101 submits in step S101a the acquired data to DC server 105, which server cannot derive the measured temperature value from the acquired data, e.g. since the data formatting of this particular M2M data is unknown to the DC server 105, as illustrated with step S102a, and responds accordingly to the smart phone 101 in step S102b.

Thereafter, the smart phone 101 and the SP node 104 engage in communication through steps S103-S105 as previously has been described hereinabove to have the acquired data interpreted such that the DC server 105 can perform data analysis.

After having received the information required for deriving the measured temperature value from the SP node 104 in step S105, the smart phone 101 forwards the information to the DC server 105 in step S105a, wherein the DC server uses the information to derive the temperature value for analysis.

As previously has been discussed, the DC server 105 may e.g. derive the temperature value from a transformed version of the acquired data supplied by the SP node in step S105, or alternatively use a template provided by the SP node 104 in step S105 and apply the template to the originally acquired data in step S101a.

It should be understood that the DC server 105 alternatively may turn to the SP node 104 directly without going via the smart phone 101. That is, the DC server 105 submits the request for assistance in step S103 to the SP node 104 and receives information required for interpreting the data in step S105 from the SP node 104.

In still an embodiment, SP node 104 may not itself have access to the information required to derive the measured temperature value, or any other information set to be derived from the originally acquired data.

Figure 4:
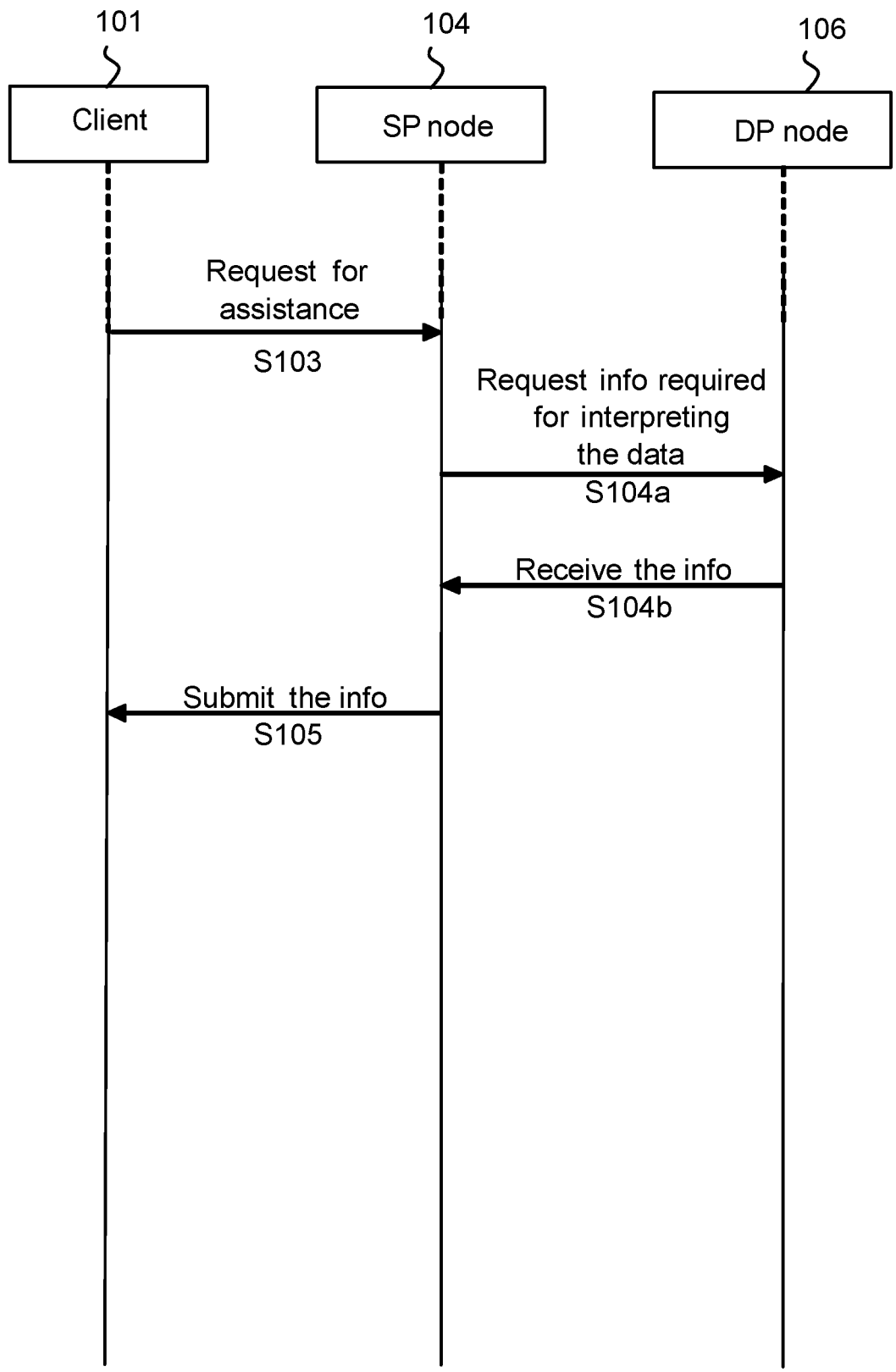
FIG. 4 shows a signalling diagram illustrating a method of accessing acquired data according to yet another embodiment.

This embodiment will now be described with reference to the signalling diagram shown in FIG. 4.

For brevity, steps S101 and S102 are not shown, but the first illustrated step is the request for assistance in step S103 to interpret acquired data.

Now, the SP node 104 will turn to a data providing (DP) node 106 in step s104a for the required information, which typically is a node associated with the originally acquired data, such as a manufacturer of the thermometer which initially measured the temperature, the value of which is to be derived from the acquired data. The DP node 106 replies by submitting the requested information required for deriving the measured temperature value to the SP node 104 in step S104b, which in its turn submits the information to the smart phone 101 in step S105 as previously has been discussed.

In still another embodiment, in case a number of information sets are to be derived from the M2M data originally acquired by the smart phone 101—such as measured temperature value, indoor lighting status, progress of washing machine programme, etc.—it may happen that the SP node 105 will turn to a number of different DP nodes, in this example a first DP node 106 and a second DP node 107.

Figure 5:
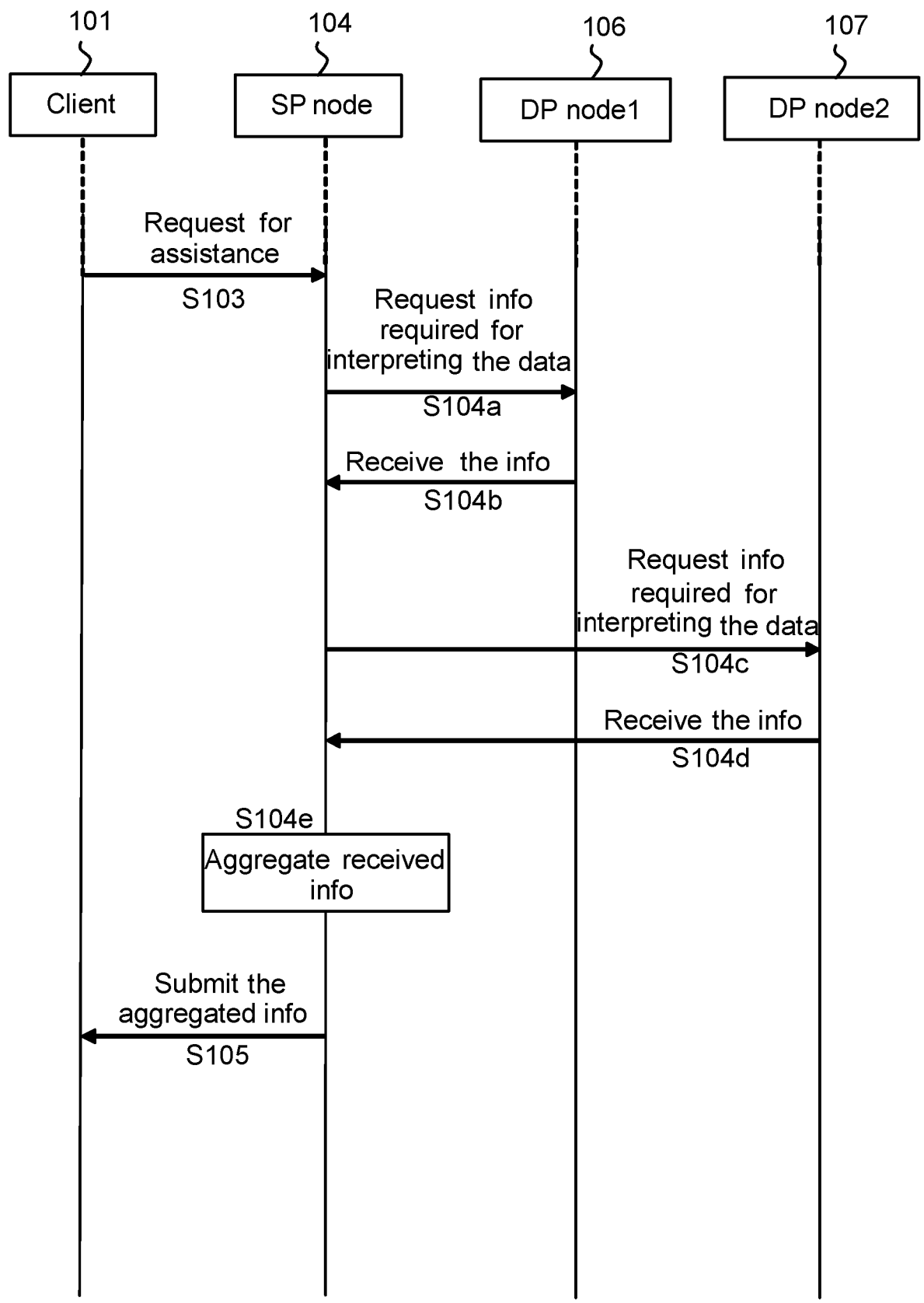
FIG. 5 shows a signalling diagram illustrating a method of accessing acquired data according to still another embodiment.

This embodiment will now be described with reference to the signalling diagram shown in FIG. 5.

Again for brevity, steps S101 and S102 are not shown, but the first illustrated step is the request for assistance in step S103 to interpret acquired data.

Now, the SP node 104 will turn to the first DP node 106 in step s104a for information required for deriving a first information set, such as the measured temperature value, which is returned by the first DP node 106 in step S104b. The SP node 104 will further turn to the second DP node 107 in step s104c for information required for deriving a second information set, such as the indoor lighting status, which is returned by the second DP node 107 in step S104d.

The SP node 105 subsequently aggregates the information received from the two DP nodes in step S104e, and submits the aggregated information to the smart phone 101 such that the first and second information sets can be derived.

In the above examples, the data acquired by the smart phone 101 is assumed to originate from a sensor, such as a thermometer.

However, many different scenarios can be envisaged. For instance, the smart phone 101 forwards data to the DC server 105 comprising a picture, a piece of text in Spanish and an audio file. As an example, the forwarded data contains information for a blog post publication to the DC server 105, which server provides a blog post service to an English-speaking audience.

The picture and Spanish text are not immediately recognizable by the DC server 105, which however can interpret the audio file. In line with the previous embodiments, the smart phone 101 receives an indication that the Spanish text and the picture cannot be correctly interpreted and requests assistance from the SP node 104, which will reply accordingly; for instance by translating the text to English and converting the picture to a format that the DC server 105 can interpret.

In an embodiment, a system comprising at least one client node 101 and at least one SP 104 node is provided.

In a further embodiment, the system further comprises at least one DC server 105.

In yet a further embodiment, the system further comprises at least one or more DP nodes 106, 107.

Again with reference to FIG. 5, in a further embodiment, the SP node 104 connects to the DP nodes, exemplified in the form of the first DP node1 106 and the second DP node 2 107, using so called Information/Content Centric Networking (ICN/CCN), sometimes also referred to as Named Data Networking (NDN). In the following, the term ICN will be used to encompass ICN, CCN and NDN technology. In contrast to traditional Internet Protocol (IP) networks, ICN networks address content objects using globally unique names instead of IP addresses.

When connecting to DP node1 106 and DP node2 107 via an ICN network, the request for information submitted over the ICN network is referred to as an "Interest".

When SP node 104 requests information that is required for interpreting data, it hence submits an Interest to the ICN network. This Interest will be received by a first upstream ICN node, for example the first DP node 106, which in its turn will forward the Interest further upstream to the second DP node 107 in case it does not have access to all the information requested with the Interest.

The second DP node 107 will submit any requested information it has access to downstream to the first DP node 106, and the first DP node 106 will in its turn deliver the requested information downstream to the SP node 104. Hence, in case of using ICN, the SP node 104 sends a single Interest to the first DP node 106, which in its turn contacts the second DP node 107. Subsequently, the SP node 104 will receive the requested information from the first DP node 106, where a part of the requested information in this particular example is provided by the first DP node 106 and another part is provided by the second DP node 107.

Should the first DP node 106 already have the requested information in its cache, it will deliver the information to the SP node 104 without submitting any further upstream request (to the second DP node 107).

In ICN, the routing of Interests is enabled by the name of a requested piece of content being a structured name (similar to domain names, but with richer syntax). Routing ICN nodes maintain a Forwarding Information Base (FIB) about where the name or name prefix should be forwarded. The routing ICN nodes along the path of the travelling Interest message keep a record of the Interest messages they have forwarded (where it came from and the content object it was naming) in their Pending Interest Table (PIT), as well as corresponding content in a Content Store (CS).

As can be concluded, when the Interest message reaches an ICN node having a copy of the content object, the content object is propagated backwards (i.e. downstream) along the path the Interest message took. The backward/downstream path is learned from the entries the Interest message left in the PIT of the ICN nodes along the path. If there were multiple Interests arriving at an ICN node for a content object address by a particular name, the content object is replicated towards each respective interface/direction the Interest messages came from. After forwarding a content object matching a pending interest, the ICN nodes delete the corresponding entry in the PIT. When the original endpoint(s) generating the interest message(s) receive the content object, the transaction is considered finalized.

If other Interest messages addressing the same content object arrive at a routing ICN node, it does not forward them, just notes them in the PIT along the entry for the named content object, which is referred to as interest aggregation. Interest aggregation is particular advantageous in case of a flash crowd event where suddenly thousands of endpoints are requesting the same content, since the source will only be reached by one request for the content, all other requests will be served from the caches of routers along the path towards the source.

Hence, ICN technology provides for an efficient, scalable and flexible approach of delivering information to an end-user.

Figure 6:
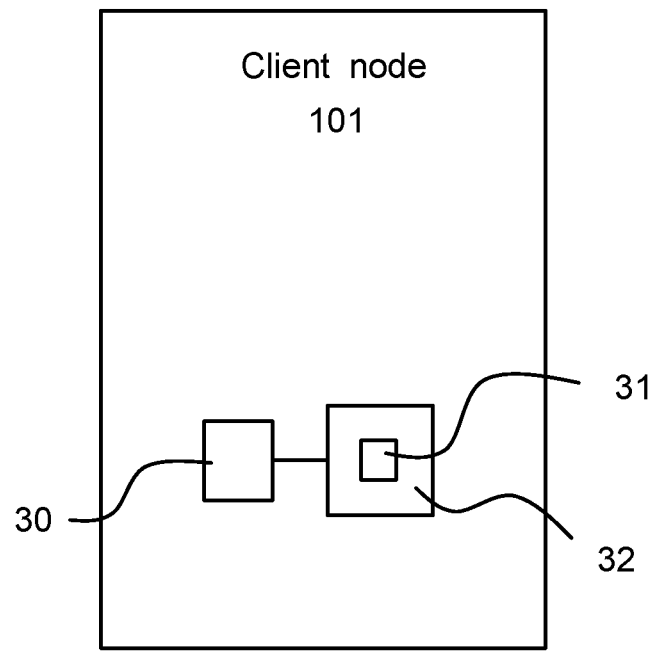
FIG. 6 illustrates a client node according to an embodiment.
Figure 7:
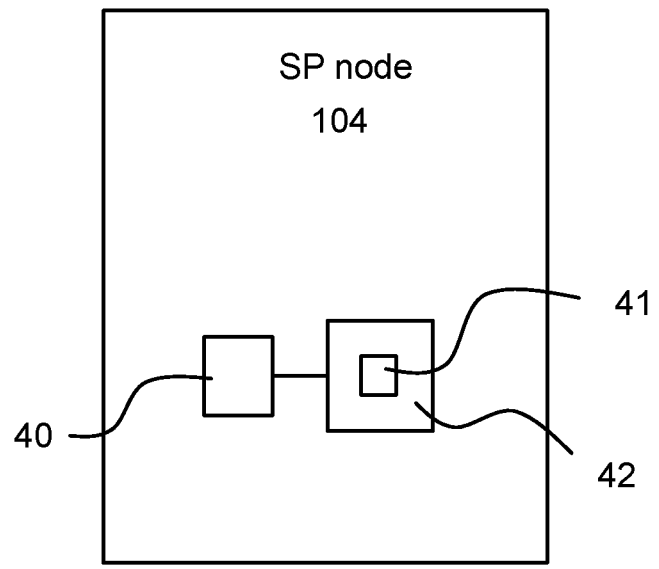
FIG. 7 illustrates a service providing node according to an embodiment.

With reference to FIGS. 6 and 7, the steps of the method performed by the client node 101 (or alternatively the DC server 105) and the SP node 104 according to embodiments are in practice performed by a processing unit 30, 40 embodied in the form of one or more microprocessors arranged to execute a computer program 31, 41 downloaded to a suitable storage volatile medium 32, 42 associated with the microprocessor, such as a Random Access Memory (RAM), or a non-volatile storage medium such as a Flash memory or a hard disk drive. The respective processing unit 30, 40 is arranged to cause the client node 101 and the SP node 104 to carry out the method according to embodiments when the appropriate computer program 30, 40 comprising computer-executable instructions is downloaded to the storage medium 32, 42 and executed by the processing unit 30, 40. The storage medium 32, 42 may also be a computer program product comprising the computer program 31, 41. Alternatively, the computer program 31, 41 may be transferred to the storage medium 32, 42 by means of a suitable computer program product, such as a Digital Versatile Disc (DVD) or a memory stick. As a further alternative, the computer program 31, 41 may be downloaded to the storage medium 32, 42 over a network. The processing unit 30, 40 may alternatively be embodied in the form of a digital signal processor (DSP), an application specific integrated circuit (ASIC), a field-programmable gate array (FPGA), a complex programmable logic device (CPLD), etc.

Figure 8:
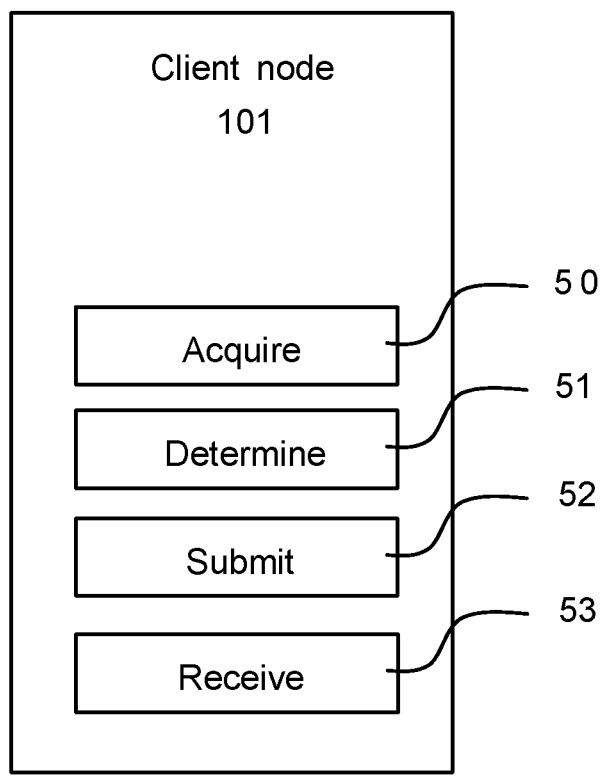
FIG. 8 illustrates a client node according to an embodiment.

FIG. 8 illustrates a client device 101 configured to access data acquired in a communication system according to an embodiment. The client node 101 comprises acquiring means 50 adapted to acquire data from which at least one information set is to be derived, determining means 51 adapted to determine that said at least one information set cannot be derived from the acquired data, submitting means 52 adapted to submit a request for assistance to derive said at least one information from the acquired data, and receiving means 53 adapted to receive, in response to the submitted request, information enabling deriving of said at least one information set.

Figure 9:
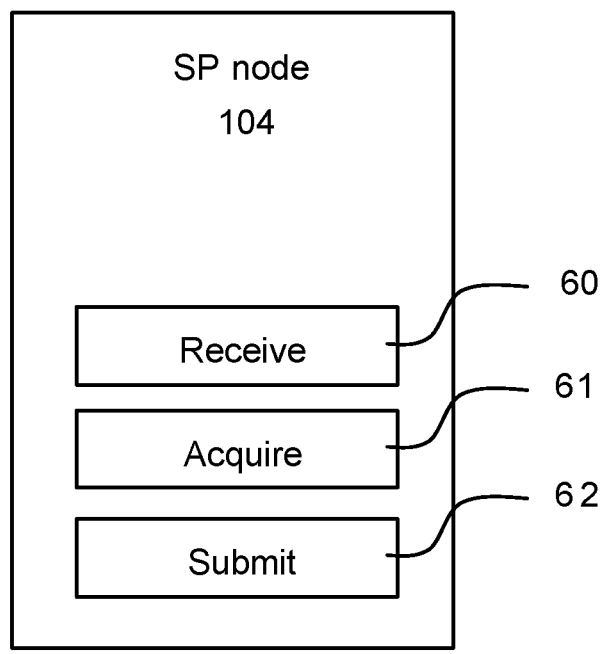
FIG. 9 illustrates a service providing node according to an embodiment.

FIG. 9 illustrates an SP node 104 configured to assist the client node 101 (or the DC server 105) to access data acquired in a communication system according to an embodiment. The SP node 105 comprises receiving means 60 adapted to receive a request for assistance to derive at least one data set from data acquired by the client node 101 (or DC server 105), acquiring means 61 adapted to acquire information required for enabling the client node 101 (or DC server 105) to derive said at least one information set, and submitting means 62 adapted to submit, in response to the submitted request, the acquired information enabling said client node 101 (or DC server 105) to derive said at least one information set.

The means 50-53 and 60-62 may comprise communications interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The embodiments of the invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of accessing data acquired in a communication system, comprising:
   acquiring, from a device operating in the communication system, the data from which at least one information set is to be derived;
   determining that the network node cannot derive said at least one information set from the acquired data;
   submitting, to another network node, a request for assistance to derive said at least one information from the acquired data;
   receiving, from the another network node and in response to the submitted request, information enabling deriving of said at least one information set from the acquired data;
   submitting the acquired data to a further network node which is to access the acquired data;
   receiving an indication that the further network node cannot derive said at least one information set from the acquired data; and responsive to receiving the indication that the further network node cannot derive said at least one information set from the acquired data, forwarding the information enabling deriving of said at least one information set from the acquired data to the further network node.

2. The method according to claim 1, further comprising: processing the received information to derive said at least one information set.

3. The method according to claim 1, wherein submitting the request for assistance comprises submitting the acquired data, and wherein receiving the information comprises receiving a transformed version of the acquired data, the transformed version being a version of the acquired data from which said at least one information set can be derived by the network node.

4. The method according to claim 1, wherein submitting the request for assistance comprises submitting an indication of a provider of the acquired data, and wherein receiving the information comprises receiving template data enabling deriving of said at least one information set from the acquired data.

5. The method according to claim 1, wherein the request for assistance comprises an indication of a computer program application of the network device deriving said at least one information set from the acquired data.

6. A method performed by a network node of assisting another network node to access data acquired in a communication system, comprising:
receiving, from the another network node, a request for assistance to derive at least one data set from data acquired by said another network node;
acquiring, from a further network node, information required for enabling said another network node to derive said at least one information set from the data in response to receiving the request from the another network node; and
submitting, to the another network node, the information acquired from the further network node, the information enabling said another network node to derive said at least one information set from the data acquired by the another network node.

7. The method according to claim 6, wherein the receiving of the request for assistance comprises receiving the acquired data;
wherein acquiring the information required for enabling said another network node to derive said at least one information set comprises transforming the acquired data to a version of the acquired data from which said another network node can derive said at least one information set, and
wherein submitting the acquired information comprises submitting the transformed version of the acquired data.

8. A network node configured to access data acquired in a communication system, comprising:
a processor; and
a memory, said memory containing instructions executable by said processor that when executed by the processor causes the network node to operate to,
acquire, from a device operating in the communication system, the sensor data from which at least one information set is to be derived,
determine that the network node cannot derive said at least one information set from the acquired data,
submit, to another network node, a request for assistance to derive said at least one information from the acquired data, and
receive, from the another network node and in response to the submitted request, information enabling deriving of said at least one information set from the acquired data;
submit the acquired data to a further network node which is to access the acquired data;
receive an indication that the further network node cannot derive said at least one information set from the acquired data; and
responsive to receiving the indication that the further network node cannot derive said at least one information set from the acquired data, forward the information enabling deriving of said at least one information set from the acquired data to the further network node.

9. The network node of claim 8, wherein the processor causes the network node to further operate to:
process the received information to derive said at least one information set.

10. The network node according to claim 8, wherein the request for assistance comprises the acquired data; and wherein the processor causes the network node to further operate to
receive a transformed version of the acquired data, the transformed version being a version of the acquired data from which said at least one information set can be derived.

11. The network node according to claim 8, wherein the processor causes the network node to further operate to:
submit an indication of a provider of the acquired data;
receive template data enabling deriving of said at least one information set from the acquired data.

12. The network node according to claim 8, wherein the processor causes the network node to further operate to submit an indication of a computer program application deriving said at least one information set.

13. A network node configured to assist another network node to access data acquired in a communication system, comprising:
a processor; and
memory, said memory containing instructions executable by said processor that when executed by the processor causes the network node to operate to,
receive, from the another network node, a request for assistance to derive at least one data set from data acquired by said another network node,
acquire, from a further network node, information required for enabling said another network node to derive said at least one information set from the data in response to receiving the request from the another network node, and
submit, to the another network node, the information acquired from the further network node, the information enabling said another network node to derive said at least one information set from the data acquired by the another network node.

14. The network node according to claim 13, wherein the processor causes the network node to further operate to:
receive the acquired data;
transform the acquired data to a version of the acquired data from which said another network node can derive said at least one information set; and
submit, to the another network node, the transformed version of the acquired data.

15. The network node according to claim 13, wherein the processor causes the network node to further operate to:
- receive an indication of a provider of the acquired data;
- acquire template data enabling deriving of said at least one information set from the acquired data; and
- submit the template data enabling deriving of said at least one information set from the acquired data to the another network node.

16. The network node according to claim 13, wherein the processor causes the network node to further operate to:
- submit a request for said information to at least one data providing network node being associated with the acquired data;
- receive said requested information from said at least one data providing network node.

17. The network node according to claim 16, wherein the processor causes the network node to further operate to:
- submit a first request for first information to a first data providing network node being associated with the acquired data for enabling deriving of a first information set from the acquired data;
- submit a second request for second information to a second data providing network node being associated with the acquired data for enabling deriving of a second information set from the acquired data;
- receive said requested first information from the first data providing network node;
- receive said requested second information from the second data providing network node;
- aggregate the first information received from the first data providing network node and the second information received from the second data providing network node, and
- submit the aggregated information to the another network node.

18. The network node according to claim 13, wherein the processor causes the network node to further operate to:
- receive an indication of a computer program application deriving said at least one information set on said another network node.

19. The method according to claim 6, wherein the request comprises an indication of an application the another network node is executing to derive the at least one information set from the data; and
- wherein acquiring the information required for enabling said another network node to derive said at least one information set from the data comprises acquiring the information based on the indication of the application the another network node is executing to derive the at least one information set from the data.

* * * * *